US 8,291,021 B2

Oct. 16, 2012

(12) United States Patent
Rowley (10) Patent No.: US 8,291,021 B2
(45) Date of Patent: Oct. 16, 2012

(54) GRAPHICAL SPAM DETECTION AND FILTERING

(75) Inventor: Peter A. Rowley, Ben Lomond, CA (US)

(73) Assignee: Red Hat, Inc., Raleigh, NC (US)

( * ) Notice: Subject to any disclaimer, the term of this patent is extended or adjusted under 35 U.S.C. 154(b) by 367 days.

(21) Appl. No.: 11/711,539

(22) Filed: Feb. 26, 2007

(65) Prior Publication Data

US 2008/0208987 A1    Aug. 28, 2008

(51) Int. Cl.
 *G06F 15/16* (2006.01)
(52) U.S. Cl. ...................................... 709/206
(58) Field of Classification Search ............... 709/206
  See application file for complete search history.

(56) References Cited

U.S. PATENT DOCUMENTS

| | | | |
|---|---|---|---|
| 6,011,537 A * | 1/2000 | Slotznick | 715/733 |
| 6,161,130 A * | 12/2000 | Horvitz et al. | 709/206 |
| 6,321,267 B1 * | 11/2001 | Donaldson | 709/229 |
| 6,574,658 B1 * | 6/2003 | Gabber et al. | 709/206 |
| 6,868,498 B1 * | 3/2005 | Katsikas | 726/14 |
| 7,092,992 B1 * | 8/2006 | Yu | 709/206 |
| 7,444,380 B1 * | 10/2008 | Diamond | 709/206 |
| 7,475,109 B1 * | 1/2009 | Fletcher et al. | 709/204 |
| 7,490,350 B1 * | 2/2009 | Murotake et al. | 726/11 |
| 2003/0041126 A1 * | 2/2003 | Buford et al. | 709/220 |
| 2003/0110400 A1 * | 6/2003 | Cartmell et al. | 713/202 |
| 2003/0220978 A1 * | 11/2003 | Rhodes | 709/206 |
| 2004/0177120 A1 * | 9/2004 | Kirsch | 709/206 |
| 2004/0221062 A1 * | 11/2004 | Starbuck et al. | 709/246 |
| 2004/0243844 A1 * | 12/2004 | Adkins | 713/201 |
| 2004/0260778 A1 * | 12/2004 | Banister et al. | 709/206 |
| 2004/0261016 A1 * | 12/2004 | Glass et al. | 715/512 |
| 2005/0015456 A1 * | 1/2005 | Martinson | 709/207 |
| 2005/0015626 A1 * | 1/2005 | Chasin | 713/201 |
| 2005/0022008 A1 * | 1/2005 | Goodman et al. | 713/201 |
| 2005/0076240 A1 * | 4/2005 | Appleman | 713/201 |
| 2005/0076241 A1 * | 4/2005 | Appleman | 713/201 |
| 2005/0097174 A1 * | 5/2005 | Daniell | 709/206 |
| 2005/0097321 A1 * | 5/2005 | Zhu et al. | 713/166 |
| 2005/0154601 A1 * | 7/2005 | Halpern et al. | 705/1 |
| 2005/0193072 A1 * | 9/2005 | Chant et al. | 709/206 |
| 2005/0193076 A1 * | 9/2005 | Flury et al. | 709/206 |
| 2005/0198159 A1 * | 9/2005 | Kirsch | 709/206 |
| 2005/0198173 A1 * | 9/2005 | Evans | 709/206 |
| 2005/0210272 A1 * | 9/2005 | Fotta | 713/188 |
| 2005/0216564 A1 * | 9/2005 | Myers et al. | 709/206 |
| 2005/0228899 A1 * | 10/2005 | Wendkos et al. | 709/232 |
| 2005/0256680 A1 * | 11/2005 | Goodman | 702/181 |
| 2005/0256685 A1 * | 11/2005 | Goodman | 703/2 |
| 2005/0283519 A1 * | 12/2005 | Turgeman et al. | 709/206 |

(Continued)

OTHER PUBLICATIONS

Oracle eMail Server—Understanding and Planning Guide, Release 5.1, Mar. 2000.*

(Continued)

*Primary Examiner* — Emmanuel L Moise
*Assistant Examiner* — Robert Shaw
(74) *Attorney, Agent, or Firm* — Lowenstein Sandler PC (57) ABSTRACT

Some embodiments of graphical spam detection and filtering have been presented. In one embodiment, an electronic mail addressed to an electronic mail account is screened. If a graphic image is embedded in a body of the electronic mail and a sender of the electronic mail is unidentified, then the electronic mail is classified as unsolicited bulk electronic mail.

10 Claims, 4 Drawing Sheets

U.S. PATENT DOCUMENTS

| | | | |
|---|---|---|---|
| 2006/0085504 A1* | 4/2006 | Yang et al. | 709/206 |
| 2006/0122957 A1* | 6/2006 | Chen | 707/1 |
| 2006/0123083 A1* | 6/2006 | Goutte et al. | 709/206 |
| 2006/0168056 A1* | 7/2006 | Gandhi et al. | 709/206 |
| 2006/0168057 A1* | 7/2006 | Warren et al. | 709/206 |
| 2006/0200530 A1* | 9/2006 | Tokuda et al. | 709/206 |
| 2007/0038705 A1* | 2/2007 | Chickering et al. | 709/206 |
| 2007/0107059 A1* | 5/2007 | Chasin et al. | 726/23 |
| 2007/0192863 A1* | 8/2007 | Kapoor et al. | 726/23 |
| 2007/0214263 A1* | 9/2007 | Fraisse et al. | 709/225 |
| 2008/0159632 A1* | 7/2008 | Oliver et al. | 709/206 |

OTHER PUBLICATIONS

Gerald Oskoboiny, Whitelist-based spam filtering http://impressive.net/people/gerald/2000/12/spam-filtering.html.*

* cited by examiner

GRAPHICAL SPAM DETECTION AND FILTERING

TECHNICAL FIELD

Embodiments of the present invention relate to electronic mail, and more specifically to screening unsolicited bulk electronic mail from incoming electronic mail.

BACKGROUND

Today, electronic mail (also commonly referred to as email) provides great convenience in communication and thus, is widely used for many purposes, including both personal and business purposes. Unfortunately, some entities, such as unscrupulous marketers, pranksters, etc. often abuse the use of electronic mail by sending out thousands of unsolicited electronic mail messages to others. Such unsolicited electronic mail messages are commonly referred to as spam and senders of spam are commonly referred to as spammers. Besides annoying the recipients, such unsolicited bulk electronic mail often takes up significant storage space in the recipients' electronic mail account and slows down network traffic.

To tackle the problem of unsolicited bulk electronic mail, some conventional spam filters have been developed to screen out unsolicited bulk electronic mail by some predetermined texts, such as words, phrases, sentences, etc., in the body of the electronic mail. Specifically, some users may have reported some unsolicited bulk electronic mail, which is analyzed to identify the words, phrases, sentences, etc. commonly used in the content of the unsolicited bulk electronic mail.

However, many spammers circumvent the above conventional text-based spam filters in various ways, such as by inserting texts commonly used in legitimate emails, deliberately misspelling some words, etc. Since spammers may not be able express their messages in text without being detected by these conventional text-based spam filters, some spammers create graphic images containing the spammers' messages and insert such graphic images into the body of spam. Such graphic images are usually in a format that can be rendered by client machines commonly used by the recipients, such as Joint Photographic Experts Group (JPEG) format, graphics interchange format (GIF), etc. Since the conventional text-based spam filters only check the text in electronic mail, the graphic images embedded in electronic mail are not checked. Therefore, unsolicited bulk electronic mail containing graphic images may pass through the conventional text-based spam filter without being detected.

DESCRIPTION OF THE DRAWINGS

The present invention is illustrated by way of example, and not by way of ion, in the figures of the accompanying drawings and in which.

DETAILED DESCRIPTION

Described herein are some embodiments of graphical spam detection and filtering. In one embodiment, an electronic mail addressed to an electronic mail account is screened. If a graphic image is embedded in a body of the electronic mail and a sender of the electronic mail is unidentified, then the electronic mail is classified as unsolicited bulk electronic mail. A graphic image as used herein generally refers to a graphic object in a predetermined format (e.g., JPEG, GIF, etc.) that can be rendered by a client machine (e.g., a personal computer, a personal digital assistant, etc.). Electronic mail as used herein broadly refers to communication transmitted electronically, such as documents (which may include text and/or graphics), audio files, video files, or a combination of any of the above. Unsolicited bulk electronic mail, also commonly known as spam, is electronic mail sent to non-requesting recipients. Though a large portion of unsolicited bulk electronic mail is commercial in nature (e.g., advertisements), unsolicited bulk electronic mail may include communication distributed for other non-commercial purposes (e.g., political speech, prank and/or joke, etc.). Details of some embodiments of the graphical spam detection and filtering are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1A:
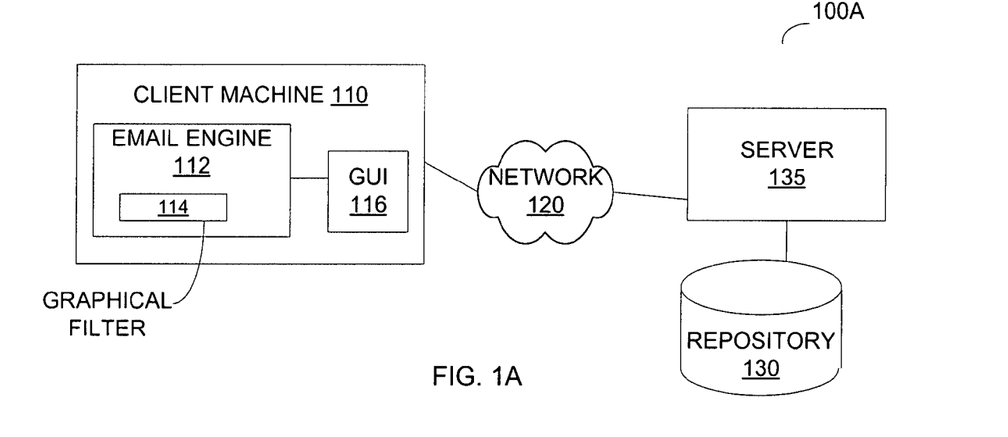
FIGS. 1A, 1B, and 1C illustrate some embodiments of an electronic stem in which embodiments of the present invention may be implemented.

FIG. 1A illustrates one embodiment of a system in which embodiments of the present invention may be implemented. The system 100A includes a client machine 110, a network 120, and a repository 130. Some examples of the client machine 110 include a desktop personal computer (PC), a laptop PC, a personal digital assistant (PDA), a cellular telephone or mobile telephone, etc. The client machine 110 includes a graphical user interface (GUI) module 116 and an electronic mail engine 112. The electronic mail engine 112 includes a graphical filter 114. The client machine 110 is communicatively coupled to the network 120. The network 120 may include various kinds of networks, such as local area network (LAN), wide area network (WAN), wireless network, wired network, etc. In addition to the client machine 110, the network 120 is further coupled to a server 135 maintaining the repository 130, such as a lightweight directory access protocol (LDAP) repository.

Note that any or all of the components and the associated hardware illustrated in FIG. 1A may be used in various embodiments of the system 10A. However, it should be appreciated that other configurations of the system 100A may include more or fewer devices than those shown in FIG. 1A.

In some embodiments, the GUI module 116 in the client machine 110 generates an electronic mail GUI to allow a user to access the user's electronic mail account. The client machine 110 receives electronic mail addressed to the electronic mail account from an electronic mail server via the network 120. The electronic mail engine 112, which serves the electronic mail account, processes the electronic mail received by screening the electronic mail using the graphical filter 114. The graphical filter 114 determines if the electronic mail contains a graphical image in its body. If so, the graphical filter 114 determines if a sender of the electronic mail can be identified. For example, the graphical filter 114 may attempt to find the sender in a predetermined list, such as an address list associated with the electronic mail account, a whitelist containing some senders pre-approved by the recipient, etc. The predetermined list may be stored on the client machine 110 and/or in the repository 130. If the predetermined list is stored in the repository 130, the server 135 sends the electronic mail with an indication as to whether the sender is pre-approved to the client machine 110. If the sender cannot be identified (e.g., the sender is not found in the predetermined list), then the graphical filter 114 classifies the electronic mail as unsolicited bulk electronic mail. Otherwise, the electronic mail engine 112 classifies the electronic mail as legitimate electronic mail and puts the electronic mail in storage designated for legitimate electronic mail, such as an inbox of the electronic mail account. More details of the electronic mail engine 112 and the graphical filter 114 are discussed below.

Figure 1B:
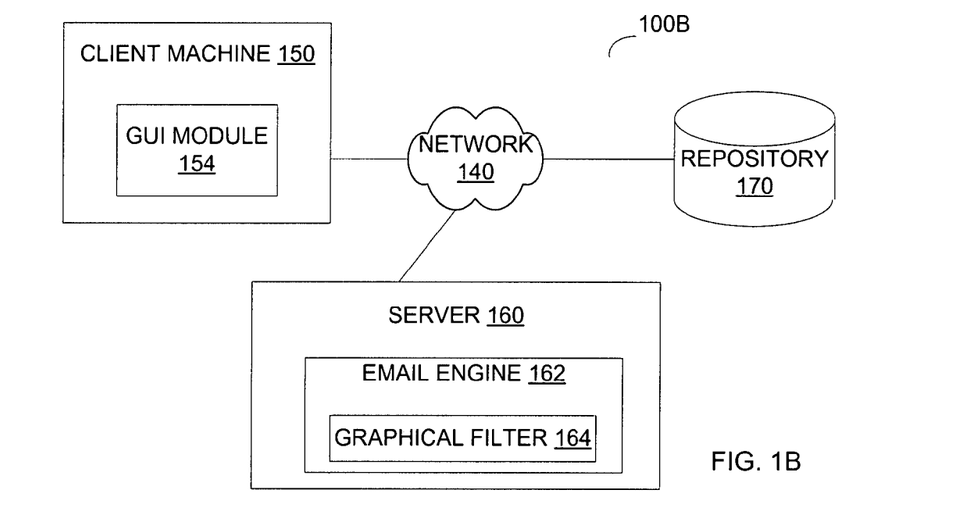

FIG. 1B illustrates an alternate embodiment of a system in which embodiments of the present invention may be implemented. The system 100B includes a client machine 150, a network 140, a server 160, and a repository 170. Some examples of the client machine 150 include a desktop PC, a laptop PC, a PDA, a cellular telephone or mobile telephone, etc. The client machine 150 includes a GUI module 154. The server 160 includes an electronic mail engine 162. The electronic mail engine 162 includes a graphical filter 164. The server 160 is communicatively coupled to the client machine 150 via the network 140. The network 140 may be further coupled to the repository 170, such as a LDAP repository. The network 140 may include various kinds of networks, such as LAN, WAN, wireless network, wired network, etc.

Note that any or all of the components and the associated hardware illustrated in FIG. 1B may be used in various embodiments of the system 100B. However, it should be appreciated that other configurations of the system 100B may include more or fewer devices than those shown in FIG. 1B.

In some embodiments, the GUI module 154 in the client machine 150 generates an electronic mail GUI to allow a user to access the user's electronic mail account via the client machine 150. The client machine 150 receives electronic mail addressed to the electronic mail account from the server 160 via the network 140. On the server 160, the electronic mail engine 162, which serves the electronic mail account, processes the electronic mail addressed to the user's electronic mail account by screening the electronic mail using the graphical filter 164. The graphical filter 164 determines if the electronic mail contains a graphical image in its body. If so, the graphical filter 164 attempts to identify the sender. For example, the graphical filter 164 may check if the electronic mail is from a sender not in a predetermined list, such as an address list associated with the electronic mail account, a whitelist containing some senders pre-approved by the recipient, etc. The predetermined list may be stored on the server 160 and/or in the repository 170. If the sender cannot be identified, then the graphical filter 164 classifies the electronic mail as unsolicited bulk electronic mail. Otherwise, the electronic mail engine 162 classifies the electronic mail as legitimate electronic mail and puts the electronic mail in an inbox of the electronic mail account. More details of the electronic mail engine 162 and the graphical filter 164 are discussed below.

Figure 1C:
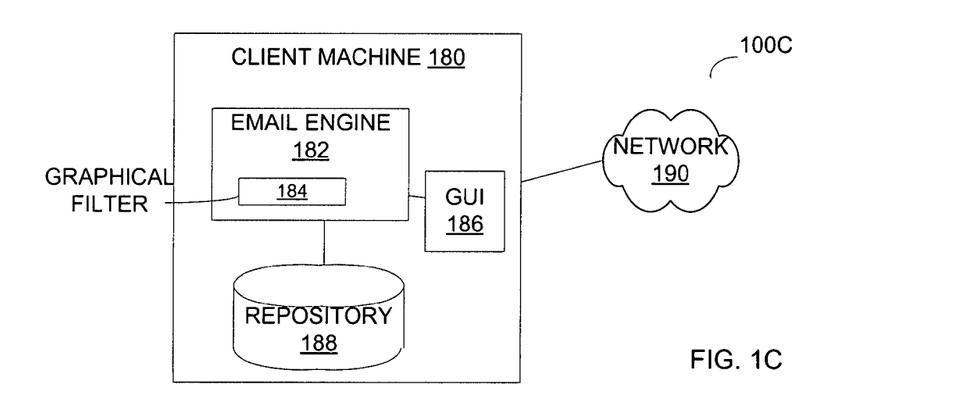

FIG. 1C illustrates another alternate embodiment of a system in which embodiments of the present invention may be implemented. The system 100C includes a client machine 180 and a network 190. Some examples of the client machine 180 include a desktop PC, a laptop PC, a PDA, a cellular telephone or mobile telephone, etc. The client machine 180 includes a GUI module 186, a repository 188, and an electronic mail engine 182. The repository 188 may include a LDAP repository. The electronic mail engine 182 includes a graphical filter 184. The client machine 180 is communicatively coupled to the network 190. The network 190 may include various kinds of networks, such as local area network (LAN), wide area network (WAN), wireless network, wired network, etc.

Note that any or all of the components and the associated hardware illustrated in FIG. 1C may be used in various embodiments of the system 100C. However, it should be appreciated that other configurations of the system 100C may include more or fewer devices than those shown in FIG. 1C.

In some embodiments, the GUI module 186 in the client machine 180 generates an electronic mail GUI to allow a user to access the user's electronic mail account. The client machine 180 receives electronic mail addressed to the electronic mail account from a sender via the network 190. The electronic mail engine 182, which serves the electronic mail account, processes the electronic mail received by screening the electronic mail using the graphical filter 184. The graphical filter 184 determines if the electronic mail contains a graphical image in its body. If so, the graphical filter 184 determines if a sender of the electronic mail can be identified. For example, the graphical filter 184 may attempt to find the sender in a predetermined list, such as an address list associated with the electronic mail account, a whitelist containing some senders pre-approved by the recipient, etc. The predetermined list may be stored in the repository 188. If the sender cannot be identified (e.g., the sender is not found in the predetermined list), then the graphical filter 184 classifies the electronic mail as unsolicited bulk electronic mail. The electronic mail engine 182 may take various actions on the unsolicited bulk electronic mail, such as deleting the unsolicited bulk electronic mail, putting the unsolicited bulk electronic mail in storage designated for such electronic mail, notifying the user of the electronic mail account of the classification, etc. Otherwise, if the sender is identified, the graphical filter 184 classifies the electronic mail as legitimate electronic mail and the electronic mail engine 182 puts the electronic mail in storage designated for legitimate electronic mail, such as an inbox of the electronic mail account. More details of the electronic mail engine 182 and the graphical filter 184 are discussed below.

Figure 2:
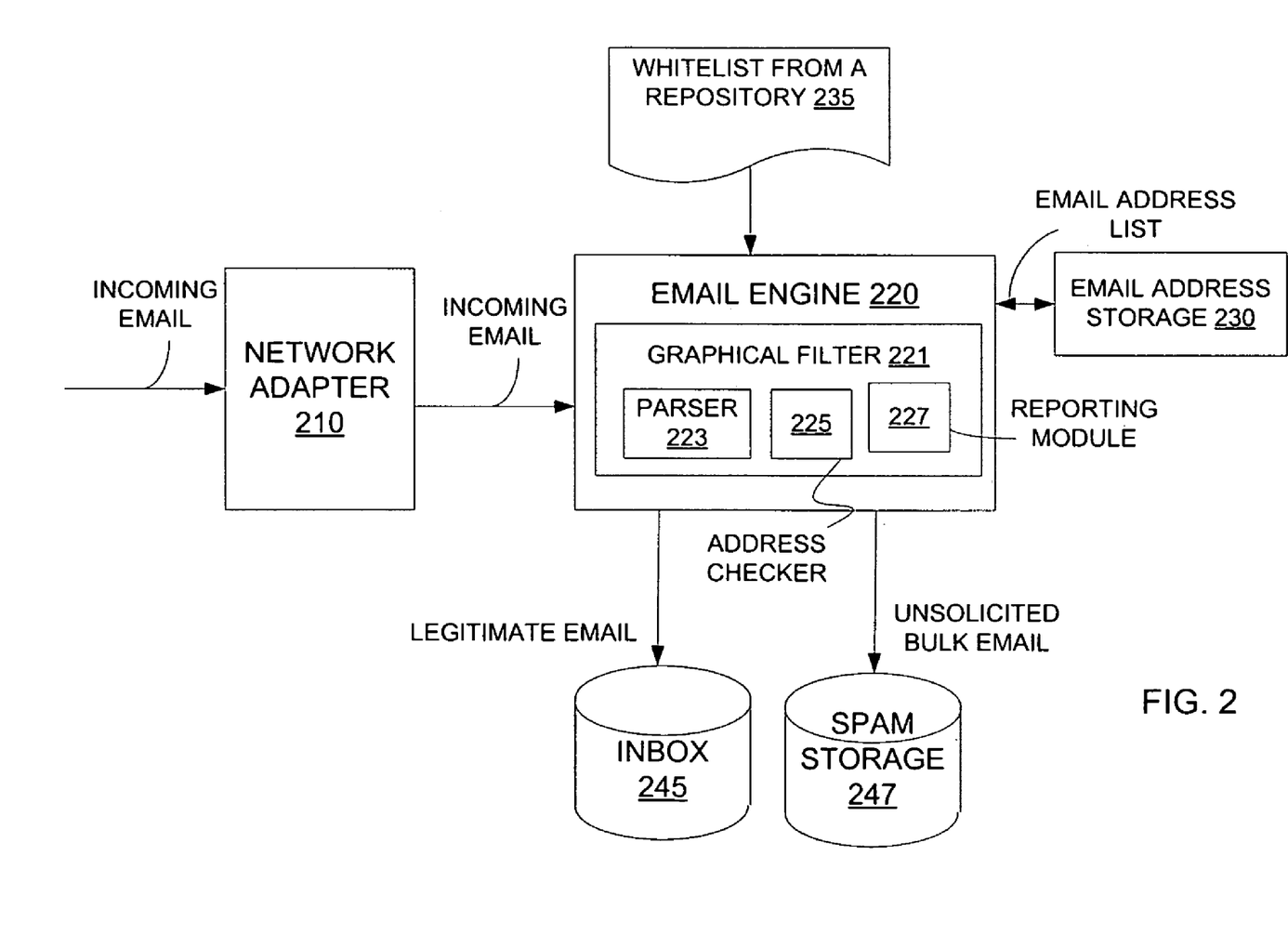
FIG. 2 illustrates one embodiment of an electronic mail engine.

FIG. 2 illustrates one embodiment of an electronic mail engine serving an electronic mail account. As described above, the electronic mail engine 220 may be implemented on a server or a client machine in a network system. Referring to FIG. 2, the electronic mail engine 220 is coupled to a network adapter 210, electronic mail address storage 230, an inbox 245, and spam storage 247. The electronic mail engine 220 includes a graphical filter 221. The graphical filter 221 further includes a parser 223, an address checker 225, and a reporting module 227.

In some embodiments, the network adapter 210 receives incoming electronic mail via a network (e.g., network 120 in FIG. 1A, network 140 in FIG. 1B, network 190 in FIG. 1C, etc.). The network adapter 210 forwards the incoming electronic mail to the electronic mail engine 220. The electronic mail engine 220 applies the graphical filter 221 to the incoming electronic mail to screen the electronic mail. Specifically, the graphical filter 221 includes the parser 223 to parse a body of the electronic mail to search for any graphic image in a predetermined format (e.g., GIF, JPEG) embedded in the body of the electronic mail. In general, the predetermined format is a format which many commonly used client machines are capable of understanding in order to render the graphic image. For example, if the body of the electronic mail contains a graphic object in JPEG format, then the parser 223 may identify the graphic object as a graphic image. In another example, the predetermined format is GIF and the body of the electronic mail only contains a link to a graphic image hosted by a web server, then the parser 223 does not identify the link as a graphic image because the link is not encoded in GIF.

Note that the electronic mail containing only the link is unlikely to be spam because most spammers do not use links in spam to avoid being traced. As explained above, many spammers try to circumvent conventional text-based spam filters by embodying their messages in graphic images and inserting the graphic images into spam. Such graphic images are in formats understood by many commonly used client machines so that the client machines may render the graphic images. Thus, the electronic mail is highly likely to be spam if the electronic mail contains a graphic image in one of the predetermined formats.

When the parser 223 finds a graphic image in the body of the electronic mail, the graphical filter 221 uses the address checker 225 to determine if the sender of the electronic mail can be identified. In some embodiments, the address checker 225 goes through an electronic mail address list associated with the electronic mail account in the electronic mail address storage 230. The electronic mail address list associated with the electronic mail account is a list of senders known to and/or approved by the user of the electronic mail account. Therefore, if the electronic mail is from a sender in the electronic mail address list, the electronic mail is not likely to be spam even though the electronic mail contains a graphic image. Alternatively, the address checker 225 may search for the sender in a predetermined list of pre-approved senders (also referred to as a whitelist 235) stored in a repository (e.g., the repository 130 in FIG. 1A, the repository 170 in FIG. 1B). For example, the whitelist 235 may include all senders from a particular company with which the user of the electronic mail account has a business relationship, all members in an organization that the user belongs to, etc. Thus, if the electronic mail is from a sender in the whitelist 235, the electronic mail is not likely to be spam even though the electronic mail contains a graphic image. In some embodiments, the address checker 225 may check both the electronic mail address list and the whitelist 235 to attempt to identify the sender of the electronic mail.

The graphical filter 221 classifies the electronic mail as unsolicited bulk electronic mail if the parser 223 finds a graphic image embedded in the body of the electronic mail and the address checker 225 cannot identify the sender of the electronic mail. Otherwise, the graphical filter 221 classifies the electronic mail as legitimate electronic mail. The electronic mail engine 220 places legitimate electronic mail into the inbox 245, which is designated as the storage for legitimate incoming electronic mail.

In some embodiments, the electronic mail engine 220 places unsolicited bulk electronic mail into the spam storage 247. Further, the reporting module 227 in the graphical filter 221 may report to the user of the electronic mail account that the electronic mail has been classified as unsolicited bulk electronic mail. For example, the reporting module 227 may generate a message to notify the user that the electronic mail has been classified as unsolicited bulk electronic mail and puts the message into the inbox 245. The user may be allowed to access the electronic mail in the spam storage 247. Alternatively, the electronic mail engine 220 may delete the unsolicited bulk electronic mail.

Figure 3:
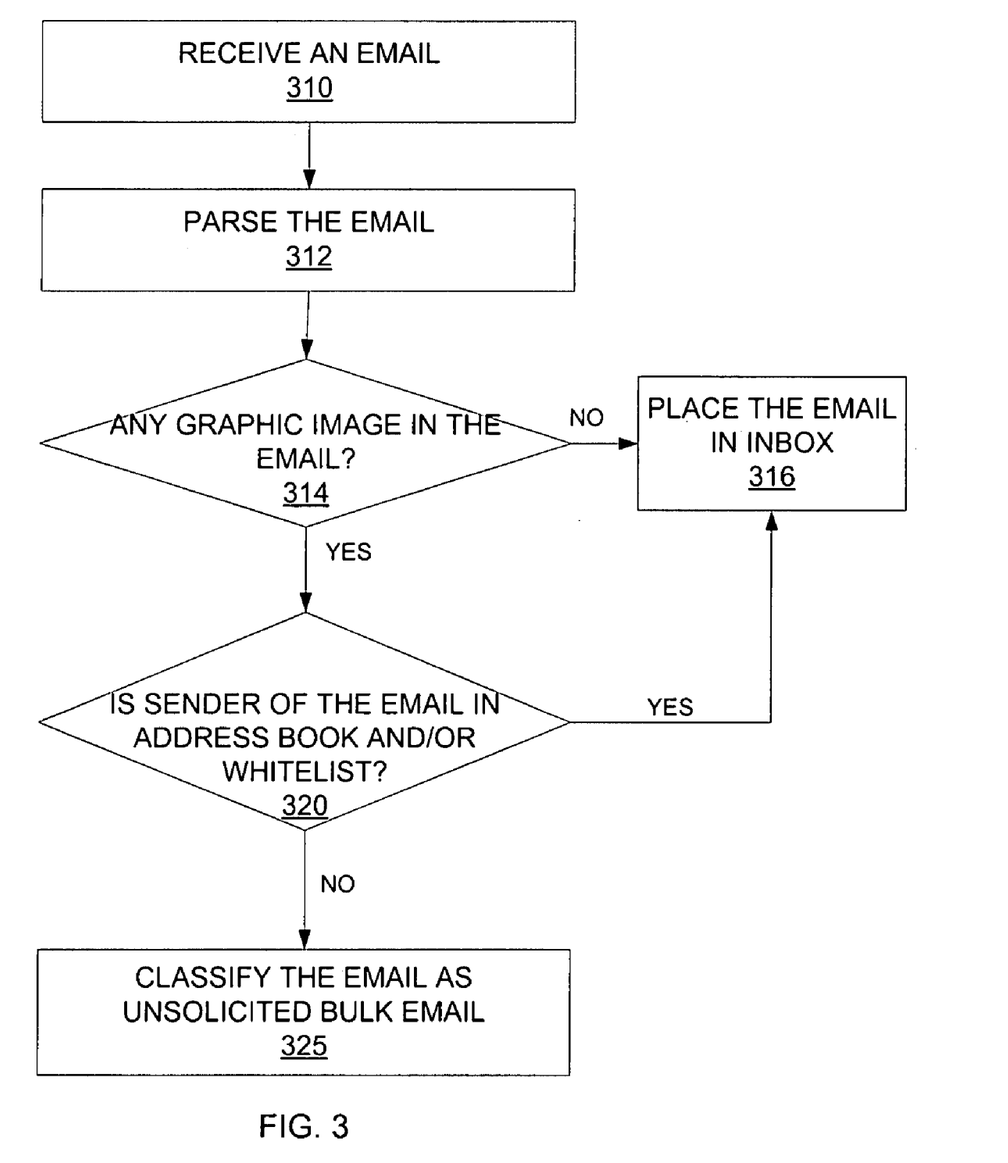
FIG. 3 illustrates a flow diagram of one embodiment of a process to electronic mail.

FIG. 3 illustrates a flow diagram of one embodiment of a process to screen electronic mail. The process may be performed by processing logic that may comprise hardware (e.g., circuitry, dedicated logic, programmable logic, microcode, etc.), software (such as instructions run on a processing device), firmware, or a combination thereof. For example, the electronic mail engine 220 in FIG. 2 may perform the process.

Referring to FIG. 3, processing logic receives an electronic mail addressed to an electronic mail account (processing block 310). Processing logic may parse the electronic mail to search for any graphic images in the body of the electronic mail (processing block 312). Then processing logic may determine if there is a graphic image in the body of the electronic mail (processing block 314). If not, then the electronic mail may not be spam. Thus, processing logic places the electronic mail into an inbox of the electronic mail account (processing block 316) and/or applies another type of filtering (e.g., text-based filtering) to the electronic mail.

If there is a graphic image in the body of the electronic mail, then processing logic checks if the sender of the electronic mail is in an address book associated with the electronic mail account and/or in a predetermined list of senders (processing block 320). If so, then the electronic mail is not likely to be unsolicited bulk electronic mail even though the electronic mail contains a graphic image. Thus, processing logic places the electronic mail into the inbox of the electronic mail account (processing block 316). Otherwise, the electronic mail contains a graphic image and is from a sender not known to or approved by the user of the electronic mail account. As explained above, such an electronic mail is highly likely to be unsolicited bulk electronic mail, and thus, processing logic classifies the electronic mail as unsolicited bulk electronic mail (processing block 325).

There are various actions processing logic may take if the electronic mail is classified as unsolicited electronic mail. For example, processing logic may delete the electronic mail. Alternatively, processing logic may place the electronic mail in a storage designated for unsolicited bulk electronic mail (e.g., a spam folder). Processing logic may further report the classification to the user.

Note that the operations described above may be performed in a different sequence in some embodiments. For instance, processing logic may attempt to determine if the sender of the electronic mail is in the address book associated with the electronic mail account and/or the predetermined list of senders before parsing the electronic mail to search for any graphic images.

Figure 4:
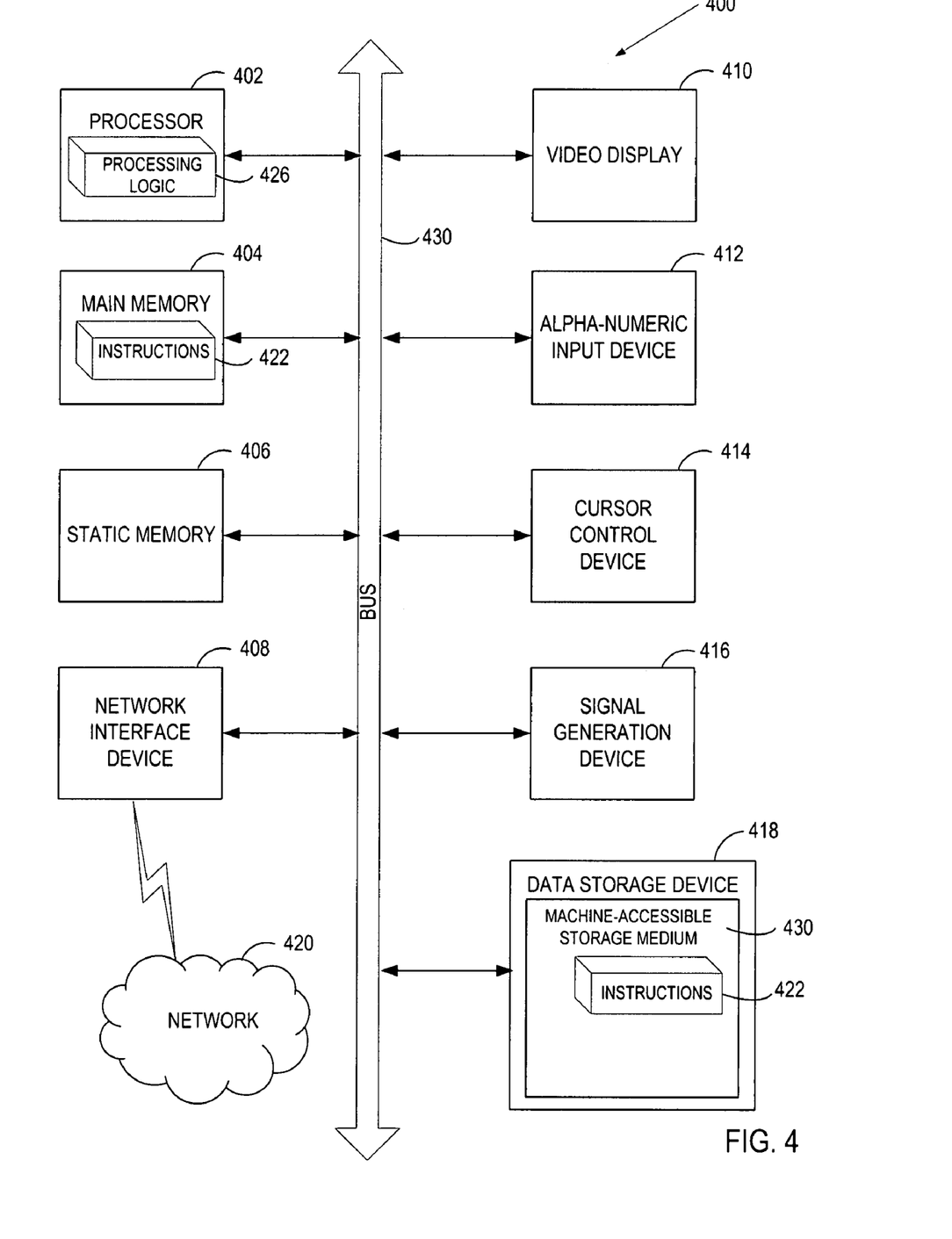
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of graphical spam detection and filtering have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising:
    a network adapter to receive an electronic mail addressed to an electronic mail account; and
    an electronic mail engine coupled to the network adapter, the electronic mail engine comprising a graphical filter to perform operations comprising:
    searching for the presence of any graphic image in an encoded graphic image format irrespective of content of the graphic image in a body of the electronic mail;
    detecting a graphic object in the body of the electronic mail;
    determining whether the graphic object only contains a link to an external address of a graphic image, whereupon the graphical filter classifies the electronic mail as not spam;
    otherwise, upon determining that the graphical object is an encoded graphic image in a predetermined format, checking, without user intervention, a predetermined list of senders comprising all members in an organization to which an owner of the electronic mail account belongs, to determine if a sender of the electronic mail is in the predetermined list of approved senders, wherein the predetermined list of approved senders is created automatically and classifying the electronic mail as spam if the sender of the electronic mail is not in the predetermined list.

2. The apparatus of claim 1, further comprising:
a lightweight directory access protocol (LDAP) repository coupled to the electronic mail engine to store the predetermined list.

3. The apparatus of claim 1, wherein the electronic mail engine comprises:
an electronic mail address storage to store the predetermined list, wherein the predetermined list includes an electronic mail address list associated with the electronic mail account.

4. The apparatus of claim 1, wherein the graphical filter comprises:
a parser to parse the body of the electronic mail to search for any graphic image in the predetermined graphic format embedded in the body of the electronic mail.

5. The apparatus of claim 1, wherein the electronic mail engine comprises:
an address checker to determine if the sender of the electronic mail is in the predetermined list.

6. The apparatus of claim 1, wherein the electronic mail engine comprises:
a reporting module to report to a user of the electronic mail account that the electronic mail is classified as unsolicited bulk electronic mail.

7. The apparatus of claim 1, further comprising:
an incoming electronic mail storage to store the electronic mail if the electronic mail is not classified as unsolicited bulk electronic mail.

8. The apparatus of claim 1, further comprising:
an unsolicited bulk electronic mail storage to store the electronic mail if the electronic mail is classified as unsolicited bulk electronic mail, wherein the electronic mail engine comprises a reporting module to report classification of the electronic mail to a user.

9. The apparatus of claim 1, further comprising:
an electronic mail server comprising the electronic mail engine; and
a client machine coupled to the electronic mail server, the client machine comprising a graphical user interface (GUI) module to generate an electronic mail GUI to allow users to access the electronic mail server.

10. The apparatus of claim 1, further comprising:
an electronic mail server; and
a client machine coupled to the electronic mail server to receive the electronic mail from the electronic mail server, wherein the client machine comprises the electronic mail engine.

* * * * *